US011525779B2

(12) United States Patent
Asakura et al.

(10) Patent No.: US 11,525,779 B2
(45) Date of Patent: Dec. 13, 2022

(54) METHOD AND DEVICE FOR MEASURING ABSORBANCE OF AQUEOUS COMPOSITIONS USING A SUBSTRATE HAVING A SURFACE WITH AN ADJUSTED CONTACT ANGLE WITH WATER

(71) Applicant: KEIO UNIVERSITY, Tokyo (JP)

(72) Inventors: Kouichi Asakura, Yokohama (JP); Akihiro Kuroda, Yokohama (JP)

(73) Assignee: KEIO UNIVERSITY, Tokyo (JP)

( * ) Notice: Subject to any disclaimer, the term of this patent is extended or adjusted under 35 U.S.C. 154(b) by 675 days.

(21) Appl. No.: 16/330,024

(22) PCT Filed: Aug. 31, 2017

(86) PCT No.: PCT/JP2017/031362
§ 371 (c)(1),
(2) Date: May 10, 2019

(87) PCT Pub. No.: WO2018/047707
PCT Pub. Date: Mar. 15, 2018

(65) Prior Publication Data
US 2019/0285543 A1  Sep. 19, 2019

(30) Foreign Application Priority Data

Sep. 6, 2016 (JP) .............................. JP2016-174084

(51) Int. Cl.
*G01N 21/59* (2006.01)
*G01N 21/35* (2014.01)
(Continued)

(52) U.S. Cl.
CPC ............ *G01N 21/59* (2013.01); *G01N 21/33* (2013.01); *G01N 21/35* (2013.01); *C09K 3/00* (2013.01);
(Continued)

(58) Field of Classification Search
CPC ........ G01N 21/59; G01N 21/35; G01N 21/33; G01N 1/2813; G01N 21/27; G01N 2021/8405; G01N 21/8422; C09K 3/00
(Continued)

(56) References Cited

U.S. PATENT DOCUMENTS 3,755,683 A * 8/1973 Kiikka .................. B29C 59/106
422/186.05
4,770,856 A * 9/1988 Uthemann ............. G01N 33/80
422/553
(Continued)

FOREIGN PATENT DOCUMENTS

JP        10-77213      *  3/1998
JP     2006026596 A        2/2006
(Continued)

OTHER PUBLICATIONS

Diffy, B. L. et al, Journal of the Society of Cosmetic Chemists 1989, 40, 127-133.*
(Continued)

*Primary Examiner* — Arlen Soderquist
(74) *Attorney, Agent, or Firm* — Law Office of Katsuhiro Arai (57) ABSTRACT

An object is to measure absorbance of aqueous cosmetic materials that have not heretofore been studied for absorbance measurement, and particularly to form a uniform layer of thin film in order to ensure accurate measurement without causing these aqueous cosmetic materials, which are O/W emulsions, to undergo phase separation during measurement. As a means for achieving the foregoing, an absorbance measurement method is provided, wherein an absorbent aqueous composition is applied on the surface of a substrate, which surface has been plasma treated, arc-discharge treated, or corona-discharge treated, to achieve a contact
(Continued)

angle with pure water of 0 to 70.0 degrees, and the applied absorbent aqueous composition is measured for absorbance.

10 Claims, 5 Drawing Sheets

(51) Int. Cl.
| | | |
|---|---|---|
| *G01N 21/33* | (2006.01) | |
| *G01N 1/28* | (2006.01) | |
| *G01N 21/27* | (2006.01) | |
| *G01N 21/84* | (2006.01) | |
| *C09K 3/00* | (2006.01) | |

(52) U.S. Cl.
  CPC ..... *G01N 21/27* (2013.01); *G01N 2021/8405* (2013.01)

(58) Field of Classification Search
  USPC .......................................................... 436/164
  See application file for complete search history.

(56) References Cited

U.S. PATENT DOCUMENTS

| | | | | |
|---|---|---|---|---|
| 5,041,266 | A * | 8/1991 | Fox | G01N 33/5304 422/552 |
| 6,352,758 | B1 * | 3/2002 | Huang | B05D 3/06 427/540 |
| 6,820,014 | B2 * | 11/2004 | Ferrero | A61K 8/35 250/372 |
| 2003/0064005 | A1 | 4/2003 | Sasaki | G01N 21/03 422/82.05 |
| 2003/0086824 | A1 * | 5/2003 | Sasaki | B01L 3/5088 422/82.09 |
| 2003/0157039 | A1 * | 8/2003 | Ferrero | A61K 8/37 424/59 |
| 2004/0081629 | A1 * | 4/2004 | Meyer | A61K 8/27 424/59 |
| 2004/0151673 | A1 * | 8/2004 | Josso | A61K 8/0279 424/47 |
| 2005/0118121 | A1 * | 6/2005 | Kuroda | A61K 8/27 424/63 |
| 2005/0164402 | A1 * | 7/2005 | Belisle | B01L 3/502792 436/174 |
| 2005/0271810 | A1 * | 12/2005 | Kobrin | B05D 1/60 427/248.1 |
| 2005/0271893 | A1 * | 12/2005 | Kobrin | C23C 16/448 428/633 |
| 2006/0057402 | A1 * | 3/2006 | Augustine | G01N 27/44752 428/447 |
| 2006/0104923 | A1 * | 5/2006 | Shah | A61K 8/33 424/59 |
| 2006/0133996 | A1 * | 6/2006 | Haywood | G01N 24/10 424/9.1 |
| 2006/0177389 | A1 * | 8/2006 | Lott | A61K 8/35 424/59 |
| 2006/0182900 | A1 * | 8/2006 | Kim | G02F 1/13363 428/1.31 |
| 2007/0092457 | A1 * | 4/2007 | LiBrizzi | A61K 8/8158 424/59 |
| 2007/0092458 | A1 * | 4/2007 | LiBrizzi | A61P 17/16 424/59 |
| 2007/0189993 | A1 * | 8/2007 | Meyer | A61Q 17/04 424/59 |
| 2007/0243613 | A1 * | 10/2007 | Miyake | B01L 3/5085 435/395 |
| 2008/0219938 | A1 * | 9/2008 | Grune | A61K 8/27 424/59 |
| 2008/0224059 | A1 * | 9/2008 | Ferrero | G01R 33/60 250/372 |
| 2009/0227755 | A1 * | 9/2009 | DeVoe | C08F 120/10 526/348 |
| 2009/0263433 | A1 * | 10/2009 | Inomata | A61K 8/27 424/401 |
| 2009/0311336 | A1 * | 12/2009 | Jones | A61K 8/37 428/407 |
| 2010/0012850 | A1 * | 1/2010 | Miura | G01J 3/42 250/372 |
| 2010/0014069 | A1 * | 1/2010 | Miura | G01N 21/33 356/51 |
| 2010/0074801 | A1 * | 3/2010 | Saiki | B01L 3/502715 422/68.1 |
| 2010/0158830 | A1 * | 6/2010 | Wei | A61Q 19/10 424/59 |
| 2010/0175488 | A1 * | 7/2010 | Kahl | B29C 59/142 73/864.91 |
| 2010/0256924 | A1 * | 10/2010 | Miura | G01N 21/33 250/252.1 |
| 2010/0292757 | A1 * | 11/2010 | Ehlbeck | B29C 59/14 607/50 |
| 2011/0189101 | A1 | 8/2011 | Fujita et al. | |
| 2011/0189723 | A1 * | 8/2011 | Yamamura | C12Q 1/04 435/29 |
| 2012/0022472 | A1 | 1/2012 | Miura et al. | |
| 2012/0219608 | A1 * | 8/2012 | Yamada | A61K 8/06 424/401 |
| 2012/0225446 | A1 * | 9/2012 | Wimberger-Friedl | G01N 1/2813 435/29 |
| 2013/0169951 | A1 * | 7/2013 | Miura | G01N 17/004 356/51 |
| 2013/0244313 | A1 * | 9/2013 | Dunn | G01N 33/56972 435/287.2 |
| 2014/0063504 | A1 * | 3/2014 | Stanfield | G01N 21/33 356/244 |
| 2015/0108360 | A1 * | 4/2015 | Stanfield | G01N 21/8422 427/160 |
| 2015/0132794 | A1 * | 5/2015 | Bauer | C12M 41/46 435/34 |
| 2015/0152046 | A1 * | 6/2015 | Abou-Khalil | C08K 5/175 106/287.18 |
| 2015/0276716 | A1 * | 10/2015 | Kobayashi | G01N 33/5041 435/6.12 |
| 2015/0308945 | A1 * | 10/2015 | Hanyu | G01N 21/59 250/372 |
| 2016/0137962 | A1 * | 5/2016 | Ejiri | C12M 23/08 435/377 |

FOREIGN PATENT DOCUMENTS

| | | | |
|---|---|---|---|
| JP | 2008062182 A | | 3/2008 |
| JP | 2012063180 A | | 3/2012 |
| JP | 2012102221 A | | 5/2012 |
| JP | 2014-71007 | * | 4/2014 |
| JP | 2014122791 A | | 7/2014 |
| WO | 87/02619 | * | 5/1987 |
| WO | 2008066138 A1 | | 6/2008 |
| WO | 2008/113109 | * | 9/2008 |
| WO | 2010113961 A1 | | 10/2010 |
| WO | 2013188320 A1 | | 12/2013 |

OTHER PUBLICATIONS

Kuroda, A. et al, Journal of Physical Chemistry B 2008, 112, 1163-1169.*
Pelizzo, M. et al, ISRN Dermatology 2012, Article 352135, 4 pages.*
Fujikake, K. et al, Skin Pharmacology and Physiology 2014, 27, 254-262.*
Wakabayashi, M. et al, Photochemistry and Photobiology 2016, 92, 637-643.*
Garoli, D. et al, Journal of Dermatological Science 2009, 56, 89-98.*
Ogzen, O. PhD thesis 2011, 131 pages.*
Maguerie, S. et al, Journal of Cosmetic Science 2012, 63, 243-254.*
Staton, J., Personal Care 2012, 104-108.*
Chen, S. et al, Journal of Colloid and Interface Science 2013, 308, 247-254.*

(56) References Cited

OTHER PUBLICATIONS

Miksa, S. et al, Cosmetics & Toiletries 2013, 128, 648-657.*
Lim, K.-B. et al, Surface and Interface analysis 2004, 36, 254-258.*
Yoshihisa, K. et al, Journal of Solif Mechanics and Materials Engineering 2012, 6, 654-659.*
Bielfeldt, S. et al, Journal of Photochemistry & Photobiology, B: Biology 2018, 189, 185-192.*
Colipa Guidelines, Method for in vitro Determination of UVA protection, 2009, (24 pages).
International Search Report (ISR) dated Nov. 21, 2017, issued for International application No. PCT/JP2017/031362, (2 pages).
ISO/TR26369, Cosmetics-Sun protection test methods—Review and evaluation of methods to assess the photoprotection of sun protection products, Technical Report, Sep. 1, 2009, (40 pages).
Japan Cosmetic Industry Association, Nihon Keshouhin Kougyou Rengokai SPF Sokuteihou Kijun (Japan Cosmetic Industry Association Standard for SPF Measurement Method) <2007 Revision>, (54 pages).
Japan Cosmetic Industry Association, Shigaisen Bougyo-yo Keshouhin to Shigaisen Boushi Kouka—SPF to PA Hyouji—(UV Protective Cosmetic Products and UV Blocking Effect—SPF and PA Markings-), 2003 Revision, (157 pages, submitted in two files).
Kengo Onishi, Toryo no Kenkyu (Research of Paint), No. 145 Mar. 2006, http://www.kansai.co.jp/rd/token/pdf/145/10.pdf, Search conducted on Aug. 19, 2010, (5 pages).
Notification of Transmittal of Translation of the International Preliminary Report on Patentability (PCT/IB/338) dated Mar. 7, 2019, for corresponding international application PCT/JP2017/031362, (6 pages).
Rohr et al., In vitro Sun Protection Factor: Still a Challenge with No Final Answer, Skin Pharmacol. Phys., 2010, 23 (4), 201-212, (12 pages).
Yasui Seiki Inc., http://www.yasuiseiki.co.jp/, Feb. 28, 2019 (2 pages), compiled with http://www.yasuiseiki.co.jp/en, Feb. 28, 2019 (2 pages).
Extended European Search Report (EESR) dated Apr. 1, 2020, issued for European counterpart patent application No. EP17848647.8 (9 pages).

* cited by examiner

METHOD AND DEVICE FOR MEASURING ABSORBANCE OF AQUEOUS COMPOSITIONS USING A SUBSTRATE HAVING A SURFACE WITH AN ADJUSTED CONTACT ANGLE WITH WATER

CROSS-REFERENCE TO RELATED APPLICATIONS

This application is the U.S. National Phase under 35 U.S.C. § 371 of International Application PCT/JP2017/031362, filed Aug. 31, 2017, which claims priority to Japanese Patent Application No. 2016-174084, filed Sep. 6, 2016. The International Application was published under PCT Article 21(2) in a language other than English.

TECHNICAL FIELD

The present invention relates to a method, and a device, for measuring the UV protection effect or infrared protection effect of an aqueous composition containing UV absorbent or infrared blocker.

BACKGROUND ART

The technical background of the present invention is explained below.

Currently in Japan, SPF (abbreviation of Sun Protection Factor) indicating the ability to protect against ultraviolet (UV) B waves of 290 to 320 nm in wavelength, and PA (Protection Grade of UVA) indicating the ability to protect against UVA waves of 320 to 400 nm in wavelength, are used as UV protection indicators for cosmetic materials. When measured results of SPF and PA are displayed on cosmetic materials, the displayed measurements or grades thereof must be based on the standard measurement methods for SPF and PA as specified by the Japan Cosmetic Industry Association (Non-patent Literature 1) (Non-patent Literature 2).

Overseas, each region basically requires SPF and PA values to be displayed according to certain measurement and marking methods (Non-patent Literature 3), but the basic measurement methods are effectively the same. Under the standard measurement methods, high-output UV light is irradiated onto the human back, and UV protection effect is measured from the resulting inflammation reaction and darkening reaction visually observed on the skin. Since human subjects are used, however, measurement is time-consuming and expensive, and it also takes a long time to obtain results.

In addition, use of human subjects also raises ethical and medical questions, etc.; accordingly, in vitro measurement methods where UV protection effect is measured with machines, instead of using human subjects, are studied in Japan and Europe (non-patent Literature 4). However, the in vitro measurement methods currently being studied reportedly have a number of problems (Non-patent Literature 5). In a study conducted by the inventor of the present invention, identical samples tested according to the same standard produced varying SPF values with up to around 20-fold differences.

There are several obvious reasons that can scientifically explain this problem, which means that understanding these causes and conducting the test under a condition where they are controlled should solve the problem. The reality, however, is that the problem is yet to be solved. Having cutting-edge technology in this scientific field, the inventor of the present invention had studied whether these causes could be controlled accurately, and if so, the accuracy, repeatability of control, and the like.

As a result, the inventor found that addressing the following issues in the sample preparation stage would hold the key to solving the problem: accurate measurement of UV absorbance is impossible if the coating film of the sample has irregular thicknesses; a thin film of several μm to less than 20 μm should be applied as smoothly as possible with the accuracy of 1 μm or so; and coating is performed without setting a coating weight per unit area.

If the sample is abundantly available and a large, flat coating film is formed over several square meters, one method is to use a large device such as those described in (Non-patent Literature 6) and (Patent Literature 1), and this method is also used in liquid crystal coating of displays, etc.

In the case of cosmetic materials, however, the sample quantities are small and the required coating areas are as small as several tens of $cm^2$. Accordingly, developing a measurement method appropriate for cosmetic materials requires understanding of relevant scientific phenomena. Also, actual studies found that spin coaters, which are believed to form smooth coating films in resist coating and other applications, permit thin streaky structures to form on the surface of coating film and thus cannot form a smooth surface, as described in Patent Literature 2. Even wire coaters, which are used when forming smooth coating films with paints, can form smooth coating films for some cosmetics, but not for other cosmetics, as demonstrated by actual testing.

Also, when it comes to paint and resist technologies, originally, the meaning of "smooth" permits variation of several tens of μm (Non-patent Literature 7), where the required accuracy is substantially different from the level required for measurement methods of UV protection effect used for cosmetic materials. For this reason, researching existing literatures and listing and testing methods that are described as capable of achieving smooth coating will only confirm the difficulty of forming thin films of cosmetic materials having various properties. This, as described in Non-patent Literature 3, is one reason why development of in vitro measurement methods is unsuccessful, although 13 years has passed since the first development and various improvements have been made around the world.

Among the above measurement methods and devices for cosmetic materials, Patent Literature 3 describes a method, and a device to implement the method, for measuring the effect of each cosmetic material, which is a liquid cosmetic material effectively assumed as an oily cosmetic material, by applying it uniformly on a quartz plate, etc., or doing so after dispersing the material in an oily solvent in the case of a powder cosmetic material.

In recent years, however, cosmetic materials and sunscreens of O/W (Oil/Water) emulsion type, of which the primary function is to absorb and/or reflect UV light, have become available on the market. These compositions behave like an aqueous solution against the object on which they are applied, but just as oily compositions are applied uniformly in Patent Literature 3 above, these cosmetic materials and sunscreens must also be applied uniformly on the surface of the base material for measurement of property to block the transmission of UV light, in particular. In addition, the thickness variation of the formed coating film must clearly be much smaller than what is expected at the levels of uniform application seen in fields other than cosmetic materials.

Surprisingly, applying such aqueous composition uniformly on the base material surface is extremely difficult, and when a quartz or other standard substrate is used as is, the formed coating film of O/W emulsion or aqueous solution can have minute irregularities, or the coating film may be formed in the shapes of islands due to the hydrophilicity of the O/W emulsion or aqueous solution, or island-like areas where coating film is not formed may occur, and for all these reasons, it has been proven inappropriate to use the methods for applying oily compositions and materials associated with these methods directly for application of aqueous compositions. There is also a practice of wearing a rubber finger cot over one's fingertip and using this covered fingertip to apply an oily composition on a substrate; however, such method causes the makeup of the composition before application to differ from the makeup of the composition of the applied film, because the oily component in the composition adsorbs onto the finger cot surface which is more lipophilic. As a result, accurately measuring the properties of compositions using this method has been difficult.

Also, accurate absorbance measurement is not possible with these compositions, unless they are formed into a uniform film. Otherwise, phase separation may occur during measurement, making it difficult to accurately measure UV protection capability.

If the coating film surface has minute irregularities and the UV transmissivity of the coating film as a whole is measured first, it is expected that, although the variation in coating film thickness due to these minute irregularities is directly linked to the variation in UV transmissivity, the coating film as a whole will have the level of UV transmissivity that is attained if the coating film is formed smoothly with an average thickness.

Contrary to this prediction, however, measuring the transmissivity of UV light through the coating film having minute irregularities reveals that this transmissivity is higher than that of a uniform coating film having a consistent average thickness, which leads in a lower value of measured SPF (UV protection index) and consequently makes accurate measurement of SPF value difficult. When the coating film is formed in the shapes of islands or has island-like areas where nothing is applied, naturally, accurate measurement of SPF value is certainly impossible.

In the field of paints and inks, it is a known general theory that an aqueous composition can be applied uniformly on a hydrophilic surface; in the case of paints and inks, however, coating films are relatively thick and not assumed to be as thin as the coating films of cosmetic materials, and moreover, there is no strict requirement as to the level of uniformness of the uniform surface of the applied film.

As described above, it is not assumed that measuring the SPF value, etc., of an aqueous cosmetic material entails forming a uniform layer of thin film, and even if an attempt is made to form a uniform layer, such attempt is clearly futile.

In addition, these same problems pertaining to the measured result of UV light absorbance and the behavior of the applied coating film, are seen with beams of light other than UV light, such as visible light and infrared light.

In the area of absorbance measurement of liquid, a method to put a liquid in a cell for measurement is known, for example; however, particularly in the case of a liquid which is applied on the skin for use and is easily separated into its so-called oil phase and water phase, the result obtained by measuring this liquid in a cell may not be accurate as it may not fully reflect the level of absorbance the liquid would demonstrate when applied for use.

Also, in view of how they are used, cosmetic materials and sunscreens may be considered to be measured for their effectiveness by recreating a condition where they are applied on the human skin surface, as described in Patent Literature 4; however, hydrophilicity and other properties of the human skin surface completely differ depending on various conditions, such as whether the skin has been washed with soap immediately before, how much time has elapsed after it was washed, and whether the skin has perspired. This is why, in many cases, the same cosmetic material can be applied uniformly on some, but not on others. Accordingly, perfect recreation of applied condition on the human skin surface has been effectively difficult. Consequently, using these inaccurate measurement results as the very characteristics of cosmetic materials, etc., has also been difficult.

Background Art Literature

Patent Literature

Patent Literature 1: Japanese Patent Laid-open 2006-26596
Patent Literature 2: Japanese Patent Laid-open 2008-62182
Patent Literature 3: Japanese Patent Laid-open 2012-63180
Patent Literature 4: Japanese Patent Laid-open 2014-122791

Non-Patent Literature

Non-patent Literature 1: Japan Cosmetic Industry Association, Shigaisen Bougyo-yo Keshouhin to Shigaisen Boushi Kouka—SPF to PA Hyouji—(UV Protective Cosmetic Products and UT 7 Blocking Effect—SPF and PA Markings—), 2003 Revision
Non-patent Literature 2: Japan Cosmetic Industry Association, Nihon Keshouhin Kougyou Rengokai SPF Sokuteihou Kijun (Japan Cosmetic Industry Association Standard for SPF Measurement Method) <2007 Revision>
Non-patent Literature 3: ISO/TR26369 Cosmetics—Sun protection test methods—Review and evaluation of methods to assess the photoprotection of sun protection products
Non-patent Literature 4: Colipa Guidelines, Method for in vitro Determination of UVA protection, 2009
Non-patent Literature 5: Rohr, M.; Klette, E.; Ruppert, S.; Bimzcok, R.; Klebon, B.; Heinrich, U.; Tronnier, H.; Johncock, W.; Peters, S.; Pfluecker, F.; Rudolph, T.; Floesser-Mueller, H.; Jenni, K.; Kockott, D.; Lademann, J.; Herzog, B.; Bielfeldt, S.; Mendrok-Edinger, C.; Hanay, C.; Zastrow, L. "In vitro Sun Protection Factor: Still a Challenge with No Final Answer" Skin Pharmacol. Phys. 2010, 23(4), 201-212.
Non-patent Literature 6: http://www.yasuiseiki.co.jp/ (Search conducted on Aug. 16, 2010)
Non-patent Literature 7: Kengo Onishi, Toryo no Kenkyu (Research of Paint) No. 145 March 2006 http://www.kansai.co.jp/rd/token/pdf/145/10.pdf (Search conducted on Aug. 19, 2010)

SUMMARY OF THE INVENTION

Problems to be Solved by the Invention

As described in Prior Art above, an object of the present invention is to measure absorbance of aqueous cosmetic materials that have not heretofore been studied for absorbance measurement, particularly to form a uniform layer of thin film in order to ensure accurate measurement without causing these aqueous cosmetic materials, which are O/W emulsions, to undergo phase separation during measurement, and, to this end, to enable the accurate absorbance of an aqueous cosmetic material and the maximum absorbance with which the characteristics of the aqueous cosmetic material are fully demonstrated (i.e., absorbance of the composition itself), to be measured using a substrate that has been treated under one set of conditions to initially have an extremely small contact angle which would then be allowed to increase over time.

Means for Solving the Problems

Accordingly, the inventor of the present invention studied in earnest and invented the method and device described below:
1. An absorbance measurement method, wherein an absorbent aqueous composition is applied on the surface of a substrate, which surface has been plasma treated, arc-discharge treated, or corona-discharge treated, to achieve a contact angle with pure water of 0 to 70.0 degrees, and the applied absorbent aqueous composition is measured for absorbance.
2. The absorbance measurement method according to 1, wherein the application amount of the absorbent aqueous composition is 0.3 to 30.0 mg/cm$^2$.
3. The absorbance measurement method according to 1 or 2, wherein the absorbent aqueous composition is an O/W emulsion.
4. The absorbance measurement method according to any one of 1 to 3, wherein the substrate is a polymethyl methacrylate plate or quartz plate.
5. An absorbance measurement sample preparation device comprising: a base on which to fix a substrate, of which the surface has been plasma treated, arc-discharge treated, or corona-discharge treated, to achieve a contact angle with pure water of 0 to 70.0 degrees; and a device for applying an absorbent aqueous composition on the surface of the substrate.
6. The absorbance measurement sample preparation device according to 5, wherein the absorbent aqueous composition is an O/W emulsion.
7. The absorbance measurement sample preparation device according to 5 or 6, wherein the substrate is a polymethyl methacrylate plate or quartz plate, of which the surface has been plasma treated, arc-discharge treated or corona-discharge treated.

Effects of the Invention

As explained below, the absorbance measurement method and device proposed by the present invention allow even an aqueous composition to be formed into a sufficiently thin, uniform coating film, to achieve the effect of permitting more accurate final values to be obtained when measuring the SPF value, UVA-PF value, critical wavelength, and other UV protection capabilities and infrared protection effects of a cosmetic material composition, as well as the effect of enabling the accurate absorbance of an aqueous cosmetic material, and the maximum absorbance with which the characteristics of the aqueous cosmetic material are fully demonstrated (i.e., absorbance of the composition itself), to be measured using a substrate that has been treated in one set of conditions to initially have an extremely small contact angle which would then be allowed to increase over time.

BRIEF DESCRIPTION OF THE DRAWINGS

FIG. 1 Perspective view of a spreading device
FIG. 2 Bottom view of a spreading device
FIG. 3 Cross-sectional view of a spreading member
FIG. 4 Cross-sectional view of a spreading member
FIG. 5 Conceptual top view of a substrate that has been coated with a cosmetic material
FIG. 6 Conceptual section view of a substrate that has been coated with a cosmetic material
FIG. 7 Graph showing how the contact angle changes after hydrophilization treatment
FIG. 8 Graph showing the relation between the water contact angle on the substrate surface, and the SPF value and UVA-PF value, of a UV absorbent sunscreen composition when the composition is of aqueous gel type
FIG. 9 Graph showing the relation between the water contact angle on the substrate surface, and the SPF value and UVA-PF value, of a UV absorbent sunscreen composition when the composition is of spray mist type
FIG. 10 Graph showing the relation between the water contact angle on the substrate surface, and the SPF value and UVA-PF value, of a UV absorbent sunscreen composition when the composition is of silicone oil/water emulsion type
FIG. 11 Graph showing the relation between the water contact angle on the substrate surface, and the SPF value and UVA-PF value, of a UV absorbent sunscreen composition when the composition contains virtually no organic compounds

DESCRIPTION OF THE SYMBOLS

1—Spreading device
2—Spreading member
3—Support part
4—Substrate
5—Cosmetic material
6—Spreading member tip part

MODE FOR CARRYING OUT THE INVENTION

The present invention is explained in detail below.
Absorbent aqueous compositions of which absorbance is measured by the absorbance measurement method and device proposed by the present invention are absorbent aqueous compositions of O/W emulsion type including W/O/W type (oil-in-water type) and water-dispersed compositions that are not emulsions. Also, so-called aqueous cosmetic materials and drugs that contain a UV absorbent, or otherwise absorb UV light, or absorb visible light and/or infrared light, are also measured.

These compositions include makeup bases, emulsified foundations, eye shadows, and other cosmetic materials used for makeup; as well as sunscreen creams, non-chemical sunscreens, day essences, day care lotions, and other cosmetic materials having sunscreen effect, colored cosmetic materials, and liniments that reflect or absorb infrared light. Also, in terms of dosage forms, these compositions take the forms of liquid, emulsion, cream, lotion, essence, etc.

And, when applied on skin, preferably on the face, body, hands, legs, etc., other than hair, these cosmetic materials, etc., achieve UV protection effect, coloring effect, or effect of preventing heating by infrared light.

The aforementioned UV protection effect is generally expressed by the SPF value corresponding to UV B waves of 290 to 320 nm in wavelength, UVA-PF value corresponding to UV A waves of 320 to 400 nm in wavelength, PA classification, or PPD value; however, any other indicator may be used without limitation so long as it indicates the effect of protecting against these wavelengths.

The coloring effect refers to the effect that makes an applied aqueous composition appear colored, because a pigment or dye contained in the applied absorbent aqueous composition selectively absorbs the sunlight or visible portion of artificial light.

The effect of preventing heating by infrared light refers to the effect achieved by a pigment, dye, or other component contained in an absorbent aqueous composition, to prevent infrared light from directly acting on the skin surface or deeper cells, even when the skin surface on which the composition is applied is exposed to the sunlight, as a result of the layer formed by the absorbent aqueous composition reflecting and/or absorbing infrared light and thereby releasing heat.

Any UV absorbent may be added without limitation to express UV absorption property, so long as it is conventionally added to O/W emulsions or water-soluble compositions, and for this reason it does not matter whether such UV absorbent is soluble in oil or water. Among these UV absorbents, oil-soluble types include cinnamic acid-based UV absorbents, triazine-based UV absorbents, benzophenone-based UV absorbents, benzoic acid-based UV absorbents, salicylic acid-based UV absorbents, dibenzoyl methane-based UV absorbents, and the like. Any one of the foregoing may be used alone or two or more types may be combined.

Also, water-soluble UV absorbents that may be used include benzophenone-based UV absorbents, phenyl benzimidazole sulfonic acids, and/or 2-hydroxy 4-methoxy benzophenone sulfonic acids, etc.

Among the oil-soluble UV absorbents, the aforementioned cinnamic acid-based UV absorbents include, for example, 2-ethyl hexyl para-methoxy cinnamate, isopropyl para-methoxy cinnamate, diethanol amine salt of para-methoxy hydrocinnamic acid, glyceryl mono-2-ethyl-hexanoate di-para-methoxycinnamate, octyl methoxy-cinnamate, methyl diisopropyl cinnamate, etc.

Similarly, among the oil-soluble UV absorbents, the aforementioned triazine-based UV absorbents include, for example, 2,4,6-tris [4-(2-ethyl hexyl oxycarbonyl) anilino] 1,3,5-triazine, bis-ethyl hexyl oxy phenol methoxy phenyl triazine, etc. The aforementioned benzophenone-based UV absorbents include, for example, 2-hydroxy-4-methoxy benzophenone, 2-hydroxy-4-methoxy benzophenone-5-sulfate, 2-hydroxy-4-methoxy benzophenone-5-sodium sulfate, 2,4-dihydroxy benzophenone, 2,2'-dihydroxy-4,4'-dimethoxy benzophenone, 2,2'-dihydroxy-4-methoxy benzophenone, 2,2',4,4'-tetrahydroxy benzophenone, 2-hydroxy-4-n-octoxy benzophenone, etc.

Similarly, among the oil-soluble UV absorbents, the aforementioned benzoic acid-based UV absorbents include, for example, para-amino benzoic acids, ethyl para-amino benzoate, butyl para-amino benzoate, 2-ethyl hexyl para-dimethyl amino benzoate, glyceryl para-amino benzoate, amyl para-amino benzoate, hexyl diethyl amino hydroxy benzoyl benzoate, etc. The aforementioned salicylic acid-based UV absorbents include, for example, 2-ethyl hexyl salicylate, triethanol amine salicylate, homomenthyl salicylate, dipropylene glycol salicylate, phenyl salicylate, amyl salicylate, benzyl salicylate, isopropyl benzyl salicylate, etc.

Similarly, among the oil-soluble UV absorbents, the aforementioned dibenzoyl methane-based UV absorbents include, for example, 4-t-butyl-4'-methoxy dibenzoyl methane, 4-isopropyl dibenzoyl methane, 4-methoxy dibenzoyl methane, 4-t-butyl-4'-hydroxy dibenzoyl methane, etc.

Besides the foregoing, the aforementioned UV absorbents also include, for example, menthyl-o-amino benzoate, 2-phenyl-benzimidazole-5-sulfate, 2-phenyl-5-methyl benzoxazole, 3-(4-methyl benzylidene) camphor, 2-ethyl hexyl-2-cyano-3,3'-diphenyl acrylate, 2-(2'-hydroxy-5'-methyl phenyl) benzotriazole, anthranilic acid, methyl 3-(4'-methyl benzylidene)-d,1-camphor, 3-benzilidene-d,1-camphor, urocanic acid, ethyl ester urocanate, etc.

Among the water-soluble UV absorbents, the aforementioned benzophenone-based UV absorbents include 2,4-dihydroxy benzophenone, 2,2'-dihydroxy-4-methoxy benzophenone, 2,2'-dihydroxy-4,4'-dimethoxy benzophenone, 2,2',4,4'-tetrahydroxy benzophenone, 2-hydroxy-4-methoxy benzophenone, 2-hydroxy-4-methoxy-4'-methyl benzophenone, 2-hydroxy-4-methoxy benzophenone-5-sulfonic acid salt, 4-phenyl benzophenone, 2-ethyl hexyl-4'-phenyl-benzophenone-2-carboxylate, 2-hydroxy-4-n-octoxy benzophenone, 4-hydroxy-3-carboxy benzophenone, etc.

Similarly, among the water-soluble UV absorbents, the preferred benzimidazole-based UV absorbents include phenyl benzimidazole-5-sulfonate and salt thereof, while the preferred benzotriazole-based UV absorbents include phenylene-bis-benzimidazole-tetrasulfonate, and salt thereof, and the like.

Substances that reflect or absorb visible light or infrared light include dyes generally used for cosmetic materials, etc., organic or inorganic pigments, metal powders, and the like, which may be able to exist in a water phase, an oil phase incompatible with the water phase, both phases, or neither phase, of an absorbent aqueous composition. Examples of pigments that scatter or absorb UV light include micronized titanium oxide, micronized zinc oxide, micronized cerium oxide, titanium oxide, zinc oxide, titania sol hydroxide, aluminum powder, gold foil powder, methylene bis benzotriazolyl tetramethyl butyl phenol, etc.

It should be noted that, if any such substance that absorbs visible light or infrared light does not dissolve, then preferably its particle size is equal to or smaller than the coating film thickness.

Furthermore, contained are the aforementioned UV absorbents and substances that reflect or absorb visible light or infrared light, and also aqueous solvents, oily solvents, emulsifiers, and various additives that are components necessary for making an aqueous composition which is of O/W emulsion type, water-soluble, etc.

Substrates that may be used for this purpose are basically plates made of quartz, glass, polymethyl methacrylate (PMMA), or polyethylene terephthalate (PET), plates conforming to ISO 24443 (hereinafter referred to as ISO plates), or sheets made of these same materials, which allow UV light in a range of 290 to 400 nm to transmit through them, if absorbance of UV light or visible light is measured; if absorbance of infrared light is measured, on the other hand, substrates made of quartz and other materials that do not absorb infrared light may be adopted similarly. It should be noted that the aforementioned ISO plates are substrates on which cosmetic materials are applied in order to obtain the SPF values, etc., of the cosmetic materials; specifically, they are PMMA plates that look like frosted glass having irregularities on one side. Examples of ISO plates include HELIO-PLATE (registered trademark) HD6 (manufactured by Helio Screen), among others. Concerning how cosmetic materials are applied on ISO plates, the adopted method is where cosmetic materials are applied and spread on these ISO plates using the tip of a finger wearing a finger cot, or tip of a finger not wearing a finger cot.

The contact angles of these ISO plates with water are very large, or specifically around 75 degrees, so simply applying absorbent aqueous compositions on these plates and sheets cannot achieve sufficiently uniform coating films if no hydrophilization treatment is given to the plates/sheets; accordingly, the substrate under the present invention is specified as any such plate or sheet of which surface has been treated for hydrophilization.

For this hydrophilization treatment, preferably plasma treatment, arc discharge treatment, corona discharge treatment, or other treatment using physical means is implemented, with the treatment intensity adjusted to achieve the aforementioned contact angles.

For the plasma treatment, arc discharge treatment, or corona discharge treatment device to be used, any known device may be adopted. Additionally, the conditions for these treatments, or specifically applied voltage and treatment time, may be determined arbitrarily to the extent that the target contact angles can be achieved, while the applicable ambience may be air in the case of corona discharge treatment, or vacuum, oxygen, or argon ambience in the case of plasma discharge treatment. Among these treatments, plasma treatment of ISO plates or quartz substrates, or corona-discharge treatment of quartz substrates, is preferred.

In the actual treatment, however, first such substrate is given corona-discharge treatment, plasma treatment, or other surface treatment to make the contact angle of the substrate surface extremely small, such as 0 degrees, after which the substrate is left in atmosphere to allow the contact angle to increase gradually up to 60.0 degrees, which is used under the method proposed by the present invention.

It should be noted that the contact angle of the substrate surface obtained immediately after treatment can be maintained over time by adjusting the surface treatment conditions (treatment ambience, etc.). However, an appropriate contact angle needed for more accurate absorbance measurement varies depending on the absorbent aqueous composition to be measured, and many substrates that have been treated (in varying treatment conditions) are needed to obtain this appropriate contact angle. The present invention uses a substrate that has been treated in one set of treatment conditions to initially have an extremely small contact angle which would then be allowed to increase over time, to enable more accurate absorbance measurement. Also, the absorbance that fully demonstrates the characteristics of the subject aqueous cosmetic material (i.e., absorbance of the composition itself, not the absorbance demonstrated when it is applied on human skin) can be measured.

It should be noted that, since it takes several days for the contact angle to increase, any changes in the contact angle occurring over the required time frame for applying the absorbent aqueous composition on the substrate and measuring its absorbance are small and have effectively no impact on the measured results.

Figure 8:
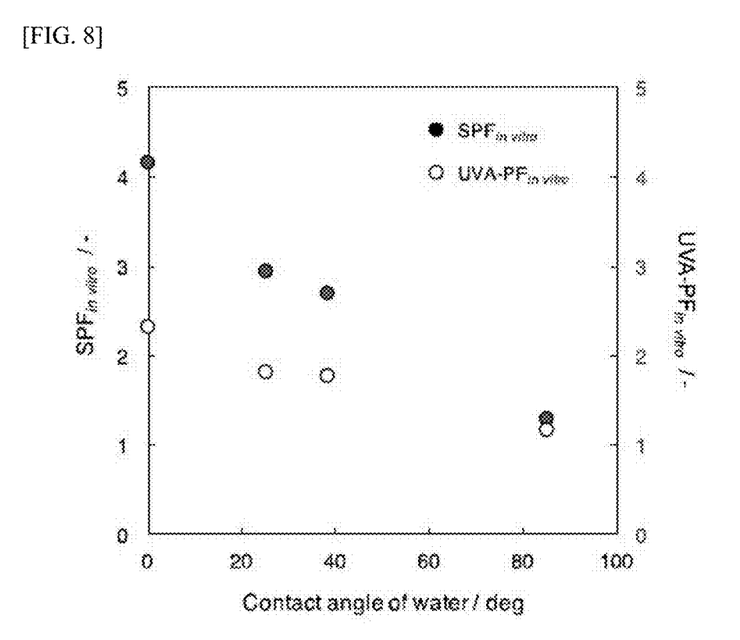
Figure 11:
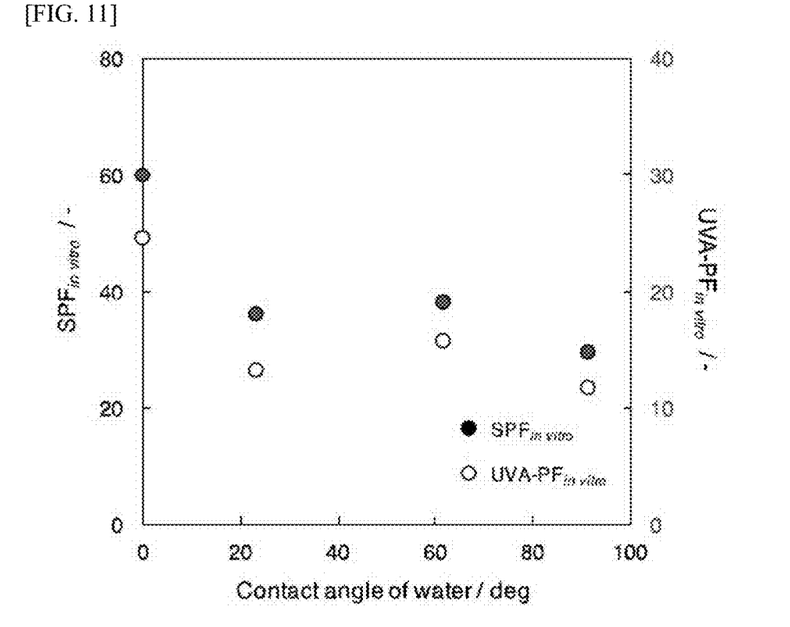

The contact angle is set freely according to the absorbent aqueous composition to be measured, such as approx. 0 degrees, approx. 0 to 15 degrees, approx. 2 to 10 degrees, approx. 15 to 30 degrees, or the like. If the absorbent aqueous composition is a UV absorbent sunscreen composition for preventing sunburn, being an absorbent aqueous composition of aqueous gel type or a composition that effectively contains no lipophilic organic compounds, then setting the contact angle to approx. 0 to 25 degrees increases the SPF value and UVA-PF value, as shown in FIGS. 8 and 11. It should be noted that the composition that effectively contains no lipophilic organic compounds can still contain hydrophilic organic compounds.

Figure 9:
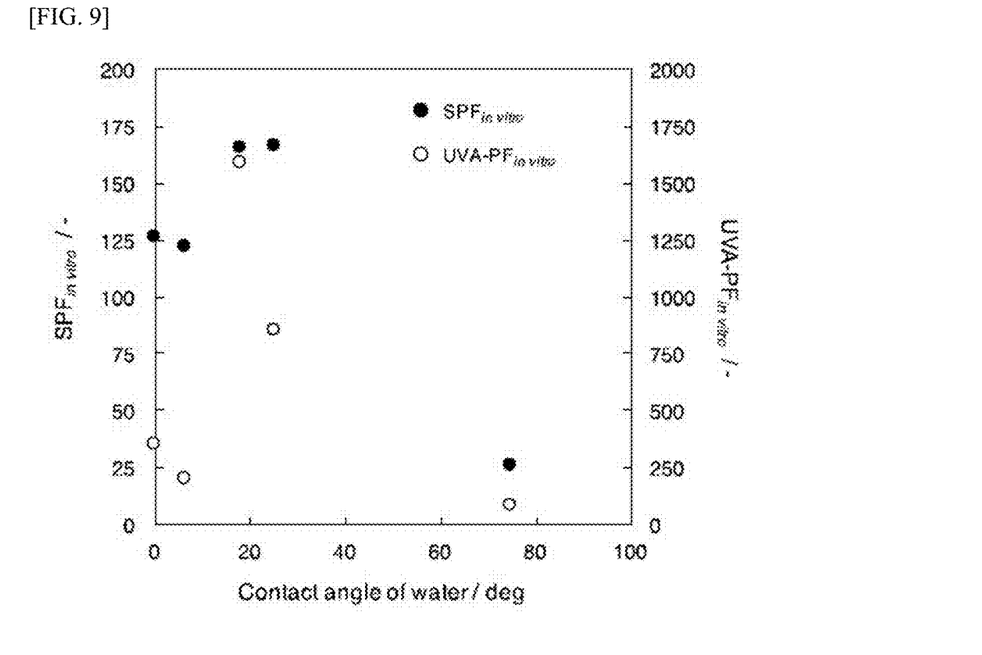
Figure 10:
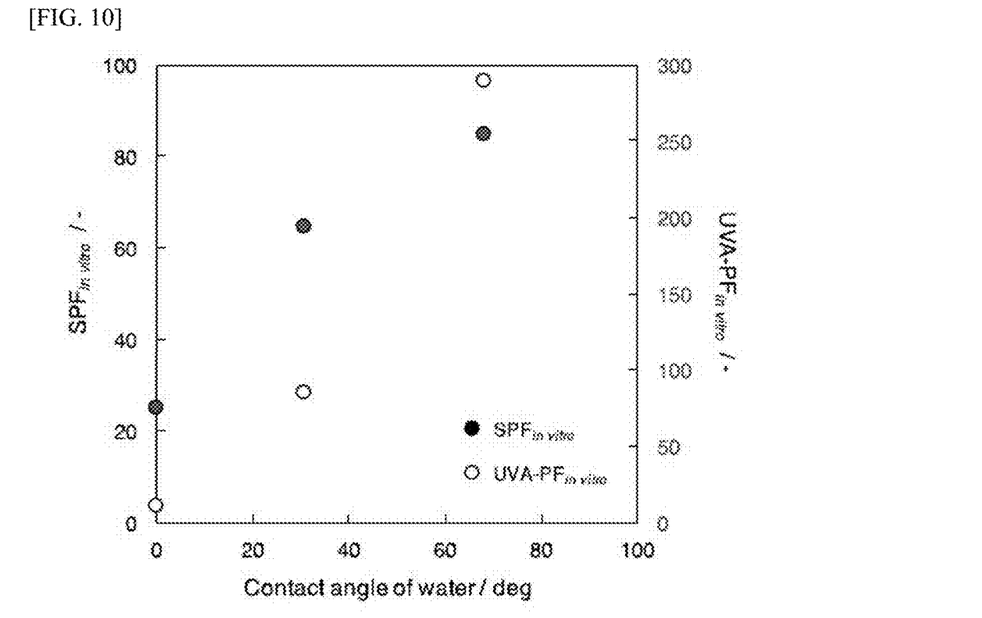

Also, as shown in FIG. 9, setting the contact angle to 10 to 28 degrees increases the SPF value and UVA-PF value if the UV absorbent sunscreen composition is of spray mist type, while, as shown in FIG. 10, setting the contact angle to 60 to 70 degrees increases the SPF value and UVA-PF value if the UV absorbent sunscreen composition is of silicone oil/water emulsion type.

By setting the contact angle of the substrate surface to the applicable contact angle range specified above according to which of the aforementioned four types of UV absorbent sunscreen compositions is measured, for example, a more uniform film can be formed compared to when the contact angle is not set to this range, and therefore higher SPF and UVA-PF values can be measured. As a result, UV absorption properties of different compositions of the same type can be measured at higher accuracy.

As shown in FIGS. 8 to 11, the dependency of the maximum SPF value and UVA-PF value on the contact angle shows that the subject absorbent aqueous composition can achieve the most uniform, stable state of UV protective coating film near the maximum values. In other words, while the UV protection capability drops due to phase separation and dewetting, the level of such drop becomes the smallest near the maximum values. Considering that the absorbent aqueous compositions are applied on the skin, their coating films may assume states other than the one near the maximum values as mentioned above; however, it is important that measured values of their UV protection characteristics are objectively similar regardless of measurement laboratories which perform the measurement, and for this reason, use of contact angles in the range near the maximum values is reasonable.

Now, absorbent aqueous compositions of aqueous gel types include, for example, oil-in-water formulations that use a hydrophilic surface active agent, beauty serum formulations prepared by thickening a water phase using a thickening agent and then dispersing a titania sol or other pigment in the thickened water phase, ointment formulations prepared by thickening a water phase using a thickening agent and then dispersing in the thickened water phase and oil phase that has been thickened using a thickening agent or a lipophilic surface-active agent, and other formulations of which the outer phase is aqueous and which use a thickening agent.

Compositions that effectively contain no lipophilic organic compounds include, among others, calamine lotion and other dosage forms that are constituted by an aqueous phase in which a material with UV protection effect has been dispersed and that must be shaken before use, as well as titania sol and other formulations of beauty serum type that are prepared by dispersing a micronized metal oxide with UV protection effect in a thickened water phase and that may contain hydrophilic organic compounds as necessary. Here, examples of hydrophilic organic compounds include aliphatic compounds containing acid groups such as hydroxyl groups and carboxylic acid groups, or polar groups such as ammonium groups, as well as some aromatic compounds containing a large number of these polar groups. Lower alcohols, glycols, glycerins, carboxylic acid-containing lower hydrocarbons, etc., are given as examples. A spray mist type covers low-viscosity lotions and oil-in-water formulations, such as formulations in which a low-concentration pigment or an organic UV absorbent, infrared reflective material, etc., is compounded in dispersed or dissolved state. A silicone oil/water emulsion type covers oil-in-water formulations of which the oil phase uses silicone oil, such as formulations that have been emulsified using volatile silicone and silicone-based surface-active agent, formulations that are shaken before use, formulations prepared by thickening a water phase and then dispersing an oil phase containing silicone oil in the thickened water phase, and the like.

Figure 7:
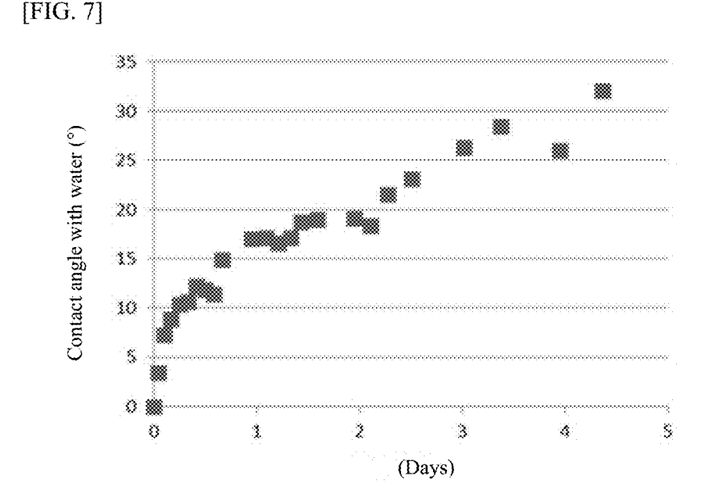

For example, although the specific period varies depending on the type of substrate and the intensity of treatment such as corona-discharge treatment or plasma treatment, the aforementioned contact angles can be achieved, as far as quartz plates are concerned, for example, by corona-discharge-treating the plates and then letting the plates stand for a half day to three days or so, as shown in FIG. 7 (the horizontal axis represents the number of days after the treatment).

Also, in some cases where the absorbent aqueous composition is low in viscosity, the composition may run off from the substrate before the substrate is set in a UV absorbance measuring device or other measuring equipment, which makes measurement difficult. When this happens, the following method can provide a remedy.

If a sample is to be coated in a partial area on the substrate, a regulating member may be provided to specify this partial area on the sample coating surface of the substrate prior to the hydrophilization treatment. Covering by such regulating member may be achieved by providing a resin layer, paper layer, metal layer, etc., on the substrate surface via a known peelable, pressure-sensitive adhesive compound layer or adhesive layer, or by forming a coating film layer using a known peelable paint, ink, etc., that can be peeled once hardened or dried.

This way, the partial area on the substrate is given hydrophilization treatment, but the substrate surface that has been covered by the regulating member as a result is not given hydrophilization treatment, which means that the liquid contact angle of the substrate surface is different between the partial hydrophilized area and the adjacent area covered by the regulating member. When the regulating member is peeled and then the sample is applied on the substrate using the spreading device 1, the result is that the partial hydrophilized area is coated, but the sample is not applied on the substrate surface that has been covered by the regulating member and therefore has not been hydrophilized. This way, the sample can be selectively applied in the partial area on the substrate, and the applied sample does not spread out, ooze out, or flow out of the partial area.

In particular, measurement of SPF value based on the present invention involves applying an aqueous composition containing UV absorbent on a hydrophilic substrate surface, measuring the UV absorption spectrum of the coating film, as absorbance, using a UV absorbance measuring device, and then obtaining the measured SPF value based on the spectrum measurement result.

Regarding the means for applying the absorbent aqueous composition on the aforementioned substrate surface, any means may be employed without limitation so long as it permits uniform application; however, the measurement method of UV protection effect for liquid cosmetic materials described below may be used directly, or it may be adopted as a method for measuring coloring effect or infrared absorption effect instead of UV protection effect, for example.

Measurement of coloring effect or infrared absorption effect is achieved by measuring the visible light or infrared absorption spectrum, just like the case of UV.

Figure 1:
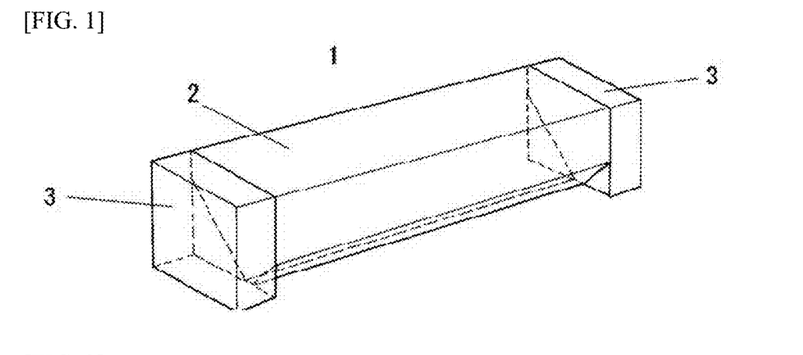

A method for measuring the UV protection effect of a liquid cosmetic material, having steps a) to d) below, is explained.

a) Step to move a spreading member that forms an angle of 30 degrees or more with a substrate, by keeping a space of preferably 20 to 25 μm from the substrate surface, and preferably at a constant speed (1 to 10 mm/s or 1 to 5 mm/s), to coat/form a smooth liquid cosmetic material layer on the substrate This spreading member is moved by the spreading device 1 shown in FIG. 1, for example.

The spreading device 1 is a device having a spreading member 2 and support parts 3 for supporting both ends of the spreading member 2.

The spreading member 2 is supported on the support parts 3 based on a structure which is not illustrated, such as pins that are provided at both end parts of the spreading member and are also engaged with grooves provided in the support parts 3 and extending in up/down directions to permit free up/down movement, wherein the weight of the spreading member resists the lift force received from the cosmetic material to be spread, so that the cosmetic material is uniformly applied on the substrate.

Although this spreading device 1 described in FIG. 1 has no other illustrated member for the sake of explanation, a member angle, etc., connecting the two support parts 3 can be provided, for example, to ensure an integral construction of the spreading device.

Figure 2:
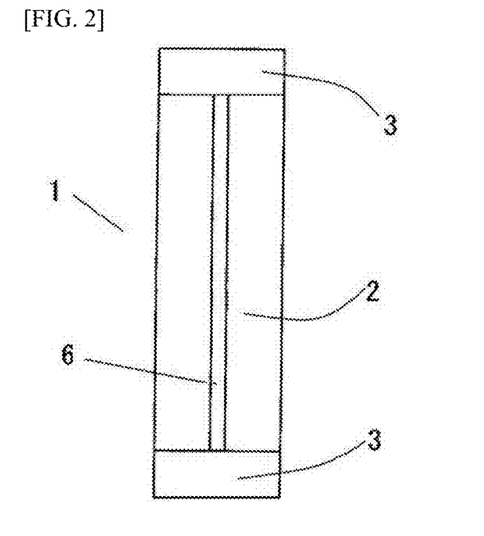

On the other hand, FIG. 2 is a view of the spreading device 1 from below, where a spreading member tip part 6 is positioned at the tip of the spreading member 2.

Preferably the material of the spreading member 2 and the support parts 3 provided on the spreading device 1 is metal; in particular, stainless steel, duralumin, or other metal having good dimensional accuracy and also machinable is preferred. Preferably the section of the spreading member used under the present invention has a polygonal shape.

Figure 3:
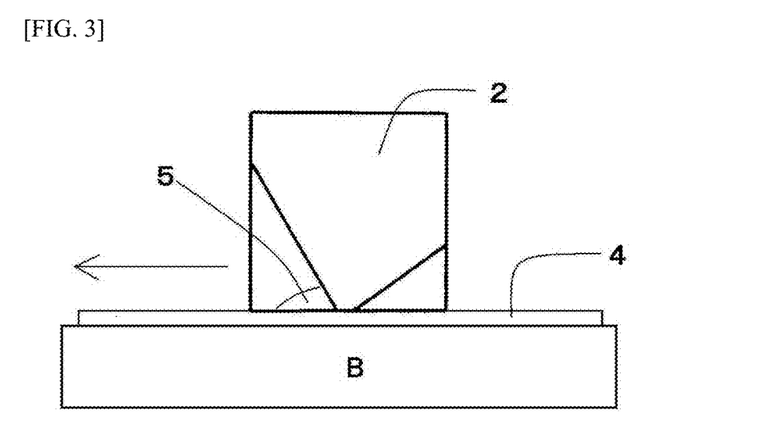
Figure 4:
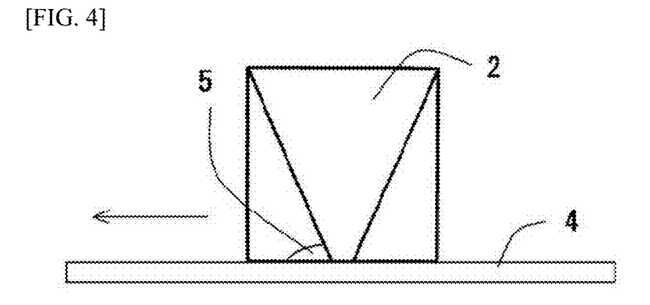

In FIG. 3, a base B for fixing a substrate 4 is provided. Additionally, as shown in FIGS. 3 and 4, the angle formed by the surface of the spreading member oriented in the moving direction of the spreading device indicated by the arrow on one hand, and the surface of the substrate 4 to be coated on the other, must be 30 degrees or more. If this angle is less than 30 degrees, a constant film thickness cannot be achieved due to the lift force applied by a cosmetic material 5 to the spreading member, and the measurement accuracy may drop depending on the cosmetic material. Similarly, when the spreading member has a cylinder shape, elliptical cylinder shape, or other shape that makes closer to 0 degrees the angle formed by the closest part of the spreading member to the substrate on one hand, and the substrate surface to be coated on the other, a constant film thickness cannot be achieved due to the lift force applied to the spreading member.

Also, preferably the height of the space formed by the spreading member tip part 6 and the substrate 4 is in a range of 20 to 25 μm. If this height is less than 20 μm, a smooth coating film may not be obtained unless the machining accuracy of the spreading member is extremely high, and given the general machining accuracies of metal spreading members, smooth coating may not be possible. A range of 20 to 25 μm represents a range where both the machining accuracy and mass-producibility of the spreading device become acceptable. If the height exceeds 25 μm, the coating film becomes thicker and the amount of UV light that transmits through the coating film decreases, and this leads to problems in that more sensitive measuring equipment is required.

The mass of the spreading member is preferably 100 g or more, or more preferably 400 g or more, if the spreading member is used alone. If its mass is smaller, the spreading member becomes more susceptible to the effect of lift force, which may disable forming of smooth film. If the mass is too large, on the other hand, the substrate and the plate supporting the substrate become warped and the substrate becomes no longer flat, which can cause the film thickness to change from one coated area to another. How much mass is applied cannot be generalized because the answer varies depending on the strength of the substrate and that of the plate supporting the substrate; based on an observation using a 5 mm thick extra-super duralumin, however, a non-negligible level of warpage occurred in the substrate when the spreading member was pressured from above and the sum of the weight of the spreading member and the load applied to it exceeded 2 kg.

Next, an example of how UV protection effect can be measured using the spreading device 1 is described.

Figure 5:
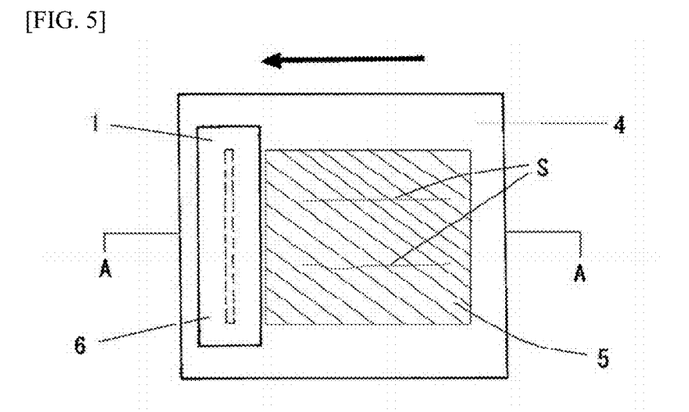

As shown in FIG. 5, the spreading device 1 is moved on the substrate 4 to apply a sample of cosmetic material, etc., uniformly on the substrate 4. Although the mechanism by which the spreading device 1 is moved on the substrate 4 is not illustrated in FIG. 5, the moving speed is kept constant as explained below.

It should be noted that, although the entire amount of the sample of cosmetic material, etc., to be applied can be supplied in front of the spreading member at the start of spreading, doing so increases the lift force that applies to the spreading member, or specifically the force that pushes the spreading member upward owing to such large quantity of sample, which means that, if the sample is to be supplied in front of the spreading member, an appropriate amount must be supplied sequentially or continuously, or the sample must be spread on the substrate 4 beforehand using a spatula, etc., to minimize the lift force that applies to the spreading member throughout the spreading step, and also reduce the fluctuation in lift force, or specifically minimize the sample present in front of the spreading member, before a smoother coating film can be formed.

Figure 6:
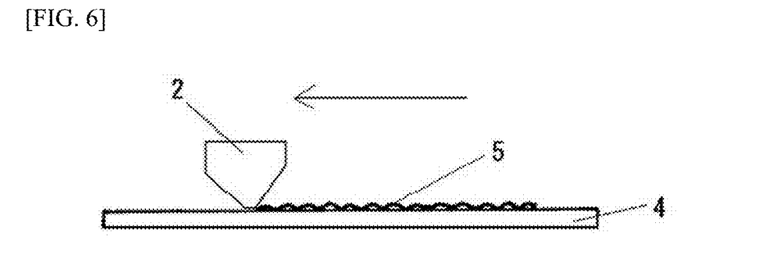

As the spreading device moves, any variation in the thickness of the sample due to the formation of stripe patterns shown by S in parallel with the moving direction, as shown in FIG. 5, must be eliminated, while any variation in the thickness caused by the streaks formed in the direction perpendicular to the moving direction, as shown in FIG. 6 illustrating a section of FIG. 5 cut along line A-A, must also be eliminated.

Coating at constant speed, which means performing coating by moving the substrate or spreading device at a constant speed using an electric cylinder, electric actuator, industrial robot, transfer machine, or other device that can operate at a constant speed; in particular, a device that uses a linear motor is preferred, partly because it provides excellent speed stability and generates large torque in the low-speed range and thus enables stable coating even when a heavy spreading device made of metal is used, and partly because speed and acceleration records can be kept. As for the constant speed, coating is performed preferably at a speed of 1 to 10 mm per second, or more preferably at a speed of 1 to 5 mm per second. If the speed is less than 1 mm per second, coating takes too long and the volatile solvent in the cosmetic material may volatilize during coating, creating compositional non-uniformity from one area of coating film to another; a speed exceeding 10 mm per second, on the other hand, presents a problem of stripe patterns forming easily. When the issues of workability, volatility, etc., are considered, the setting of 5 mm per second is most preferable.

Also, bar coaters, etc., used for coating paints, etc., are designed to move the coating target at a high speed of, for example, 150 mm per second, and although coating paints, etc., of low viscosity at this speed still eliminates stripe patterns over time, the present invention relates to cosmetic materials and thus does not require coating speed as high as 150 mm per second, and also because cosmetic materials are high in viscosity and high coating speed tends to generate lift force that makes smooth coating difficult, coating must be performed at extremely low speed, and, furthermore, the method of moving the spreading device with respect to the substrate is completely different, in principle, from the conditions used for forming smooth coating films of paints, etc. It should be noted that, under the present invention, smooth coating film refers to a coating film which is not only free from surface irregularities, but the film thickness is also constant.

Means for performing coating at constant speed using the spreading device 1 include, for example, the means described in Non-patent Literature 8 where a metal plate or column that has been machined to a high degree of smoothness (preferably made of extra-super duralumin or other high-strength material of low specific gravity to prevent deformation due to its own weight or the load of the spreading member) is fixed or connected horizontally, via the support parts, on a linear motor, electric cylinder, etc., providing a means for constant movement at low speed, after which a bar or other means for fixing the spreading member is installed, and the substrate and spreading member used for coating are installed on the bar, etc.

Such means need to be custom-ordered or self-built, because no commercial products are available.

It should be noted that commercial coating testers used for testing paints generally use motors and gear ratios suitable for high-speed coating and thus demonstrate poor speed stability and accuracy in the low-speed range, and in many cases they are not suitable for the purpose of forming smooth coating films. To begin with, catalogs of coating testers generally use m/min as a unit of coating speed and speeds are also adjusted in units of 1 m/min, which makes low speeds expressed in units of mm/min or cm/min an unknown territory not conceived by these devices. In particular, smoothly coating formulations like cosmetic materials of which viscosity, thixotropic property and adhesive property vary widely, requires coating means that can demonstrate sufficient torque and speed stability. Also, paint testers are generally constructed in such a way that a coating implement is fixed thereon and allowed to make pressure contact steadily with the coating surface.

However, fixing both ends of the coating implement, for example, causes the coating film thickness to vary between the center and the ends, which leads to a problem that a smooth coating film cannot be formed; in other words, coating testers configured to let the coating implement make pressure contact with the coating surface present a problem in that the coating accuracy required by the present invention cannot be achieved easily.

The substrate 4 used in the present invention must be smooth. Under the present invention, smooth refers to the value of standard deviation/average coating weight being 0.15 or lower, or preferably 0.1 or lower, based on the measured average coating weight per unit area and the standard deviation. Here, presence of irregularities means the coating film thickness changes at these irregular areas, which presents a problem in the step of calculating the UV protection effect at the target coating weight per unit area, because the obtained value of measured UV protection effect becomes inaccurate. For example, the ISO24443 method and FDA method specify that PMMA (polymethyl methacrylate) plates with irregularities be used, where the level of irregularities is described as approx. 2 or 6 μm. When a sample is coated using the spreading member having a space of 25 μm from a substrate, the achieved film thickness becomes around 10 μm, which means that the aforementioned irregularities could cause variation in a range of several tens of percent of the average film thickness. In the case of a product offering high UV protection effect, the impact this variation range has on the measured value of its UV protection effect is huge, and such impact may lead to a loss of trust in the product, which is not desirable. The substrate 4 used in the present invention should not only have such contact angle with pure water that achieves hydrophilicity of a specified range, but it should also be made of quartz, synthetic quartz, polymethyl methacrylate, or other material that ensures clarity under UV light in a range of 290 to 400 nm, and should also have a fully hydrophilized surface, and, when sinking of the spreading member into the substrate due to its own weight is considered, use of a substrate made of a hard material such as quartz or synthetic quartz is more preferred.

Coating weight is measured for coating films formed at multiple points on a substrate and/or on multiple substrates, to obtain an average coating weight and a standard deviation.

When the spreading device 1 is used to coat the substrate smoothly at a constant speed, how the sample is placed makes distinct differences.

In the case of a cosmetic material of low viscosity, placing a sufficient quantity of sample in front of the spreading device in its moving direction has little impact in terms of lift force; with a cosmetic material of high viscosity, however, doing so creates a problem because the spreading member tends to receive a lift force and the film thickness varies easily.

Particularly when a large lump of cosmetic material is present in front of the spreading device in its moving direction, the spreading member rides over the cosmetic material, which can cause the film thickness to become non-uniform. For this reason, preferably the cosmetic material is thinly spread with a spatula, etc., beforehand in front of the spreading device in its moving direction, and then the spreading device is run quickly, thus forming a smooth coating film. Additionally, too small a spreading amount can cause the film thickness to become non-uniform. As a rough guide, preferably an application amount of 0.3 to 30.0 mg/cm$^2$ or so in pre-dry weight is spread beforehand, where this amount may be approx. 0.4 to 5.0 mg/cm$^2$.

Preferably the spreading device 1 is configured such that the value calculated by dividing the maximum value, by the minimum value, of the dimension of the area that forms a passageway of the sample (not the length of the spreading member, but the dimension of the spreading device in its moving direction, or specifically the width of the spreading member tip part 6 in FIG. 6) is smaller than 2.

b) Step to measure, before the formed layer dries, the coating weights of a part of the substrate and per unit area, or the thickness of the layer As an example of measuring the coating weight per unit area of the sample, preferably the following method is followed, as shown in FIG. 6. It should be noted, however, that these steps may be performed in any order and one or more of them may be simplified, so long as the purpose is achieved.

A) Prepare a resin film cut to a specified size, through which the volatile components used in the cosmetic material are impermeable or poorly-permeable.

B) Obtain the mass per unit area of the resin film.

C) Measure the mass of the cut resin film 7, and obtain the area of the cut resin film from its mass per unit area.

D) Obtain the mass of the substrate 4 to be measured.

E) By following the method under the present invention, coat the sample 5 of the cosmetic material, and immediately thereafter place the cut film on the surface of the sample 5 and let it stand still.

F) Wipe off the sample in the areas not covered by the resin film.

G) Measure the mass of the sample that now consists of the resin film, cosmetic material and substrate.

H) Measure the mass per unit area of the cosmetic material from the measured values obtained above.

Here, the resin film through which the volatile components used in the cosmetic material are impermeable or poorly-permeable is preferably a polypropylene or polyethylene terephthalate film, or more preferably a polyethylene terephthalate film of 50 to 100 μm in thickness. By covering the resin film over the sample immediately after coating, volatilization of the volatile components is prevented, and stable measured values can be obtained. If the volatile components volatilize during measurement, the concentration of the cosmetic material changes, causing the viscosity to rise and other properties to vary accordingly, which not only prevents accurate measurement of coating weight, but since the measured value changes depending on the time until measurement, the same sample can also produce widely varying measured values among different laboratories or individuals performing the measurement.

Although this applies to all measurements, under the present invention, too, values are measured accurately to the unit of 0.1 mg. Since the result is strongly affected by the static electricity in the sample, preferably measurement is performed after the sample has been fully destaticized using a destaticizing device.

Additionally, when the film thickness of the sample is measured, a non-contact optical film thickness measuring device can be used.

Next, in the aforementioned step to measure the UV protection effect of the smoothly coated sample, preferably an SPF analyzer or other commercial device for measuring UV protection effect is used.

As for the measurement location at which the sample is measured, preferably the sample is measured at a position as far away as possible from the starting position of coating. In addition, preferably the measurement covers a range of 290 to 400 nm in units of 1 nm.

Next, a step to calculate the target, or specifically the UV protection effect at a specific coating weight per unit area, from the data obtained in steps c) and d), is explained.

The coating weight per unit area (or film thickness), and the UV protection effects at different wavelengths in this coating weight, have already been measured in the aforementioned steps. However, this coating weight is not the same but changes from one sample to another, so measured values cannot be compared directly. For this reason, a specific coating weight per unit area must be set and the absorbance (or transmissivity) calculated at each wavelength based on this value, to obtain the SPF value and UVA-PF (UV A wave protection index) value.

When the specific coating weight per unit area is given by M and the measured coating weight per unit area of the sample is given by N, the UV protection effect curve at coating weight M is calculated by multiplying the absorbance for each wavelength (value obtained together with the absorption spectrum) by the value of M/N, after which the SPF value and UVA-PF value are calculated from this curve.

On the basis of film thickness, a target film thickness is specified, and the UV protection effect curve is obtained by the same operation, after which the SPF value and UVA-PF value are calculated from this curve. It should be noted that these values can also be obtained based on transmissivity, instead of absorbance.

At this stage, the target specific coating weight per unit area was still unknown. Accordingly, commercial products were purchased and, from their SPF values, PA classifications and their correlations with the values calculated above, which level the target specific coating weight per unit area should be in order to achieve results close to the values displayed on each commercial product was studied.

Based on Japanese products manufactured by Shiseido and Kanebo Cosmetics, the measured values became close to the displayed values at a coating weight of 1.0 mg/cm$^2$. Based on products of the European brand L'Oréal, on the other hand, the measured values became close to the displayed values at a coating weight of 0.75 mg/cm'. Here, preferably a graph of coating weight, SPF value, and UVA-PF value is drawn to obtain an approximate expression. In the case of liquid cosmetic materials, preferably linear approximation or exponential approximation is used.

It should be noted that, in calculating the SPF and UVA-PF values, the SPF V3.0 software program that came with Solar Light's SPF-2905 was used. However, any of the programs for calculating UV protection effect currently studied in various regions can be used, as well.

Based on the data obtained in the above steps, the UV protection effect at the target specific coating weight per unit area is measured. Here, preferably a graph of coating weight, SPF value, and UVA-PF value is drawn to obtain an approximate expression. In the case of powder cosmetic materials, preferably exponential approximation is used, instead of linear approximation, because the R square value indicating correlation takes 1 or a value close to 1.

EXAMPLES

The present invention is explained in greater detail below by citing examples; it should be noted, however, that the present invention is not limited to these examples.
(Method for Measuring Contact Angle)

Contact angle was measured using a contact angle measuring device (SImage Entry 5 manufactured by Excimer); specifically, contact angle was measured several times by dropping 3.1 μL of distilled water onto the sample and then obtaining the average.
(How to Obtain SPF and UVA-PF)

SPF and UVA-PF were calculated according to ISO24443 (2012) using the SPF V3.0 software program that came with Solar Light's SPF-2905, based on the results of measuring the range of 290 to 400 nm in units of 1 nm. The software performed the following calculations:

$$SPF_{in\ vitro} = \frac{\int_{\lambda=290}^{\lambda=400} E(\lambda) \times I(\lambda) \times d\lambda}{\int_{\lambda=290}^{\lambda=400} E(\lambda) \times I(\lambda) \times 10^{-A_0(\lambda)C} \times d\lambda}$$

$$UVA\text{-}PF_{in\ vitro} = \frac{\int_{\lambda=320}^{\lambda=400} P(\lambda) \times I(\lambda) \times d\lambda}{\int_{\lambda=320}^{\lambda=400} P(\lambda) \times I(\lambda) \times 10^{-A_0(\lambda)} \times d\lambda}$$

E(λ), P(λ): Erythema action spectrum
I(λ): Spectral irradiance received from the UV source
$A_0(\lambda)$: Mean monochromatic absorbance of the test product layer before UV exposure
dλ: Wavelength step
C: Scalar value between 0.8 and 1.6.

Example 1

An ISO plate treated with plasma, and an ISO plate not treated with plasma, were prepared. These two different plates were placed side by side, and sample 1 was applied on the top surfaces thereof using a spreading device. After the application, the plates were let stand for 1 hour at 23° to dry the coating film, where the application amount was 1.3 g/cm$^2$ in dry weight.

For the plasma treatment, JEOL's Auto Fine Coater JEC-3000FC was used, after changing the metal target to aluminum to prevent deposition, to irradiate plasma for 23 seconds in vacuum under a condition of 40 mA.

UV absorption wavelengths (absorption spectrum) of the coating film were measured immediately after application, and also immediately after drying, and the SPF value and UVA-PF value were obtained from the resulting absorbance at each wavelength.

The results are shown in Table 1.

Sample 1: Composition containing water, ethyl hexyl methoxy cinnamate, ethanol, PG (propylene glycol), dimethicone, ethyl hexyl triazone, hexyl diethyl amino hydroxy benzoyl benzoate, and BG (1,3-butylene glycol).

TABLE 1

| Sample | Plate | Time | SPF | UVA-PF |
|---|---|---|---|---|
| Sample 1 | Untreated | Immediately after | 15.9 | 5.1 |
| | | 1 h | 12.8 | 3.8 |
| | Treated with plasma | Immediately after | 11.1 | 3.9 |
| | | 1 h | 11. | 3.5 |

According to the results shown in Table 1, the O/W emulsion type aqueous composition containing UV absorbent, when applied on the plasma-treated ISO plate (contact angle: 0 degrees), produced an application layer that remained uniform even after 1 hour from the application, with the measured values of SPF and UVA-PF remaining virtually the same as the levels measured immediately after the application.

When the composition was applied on the ISO plate not treated with plasma, on the other hand, uniform application could not be achieved and the measured values of SPF and UVA-PF became unstable and clearly changed over time.

According to these results, use of the plasma-treated ISO plate enabled the SPF and UVA-PF values to be measured more accurately in a manner free from measurement variation, etc., and also allowing the characteristics of the O/W emulsion type aqueous composition containing UV absorbent to be demonstrated maximally.

Example 2

A quartz plate not treated with plasma (water contact angle: 74.9 degrees) was prepared. Also, a quartz plate immediately after having been treated with plasma (water contact angle: 0 degrees), and plasma-treated quartz plates that had been aged until the contact angle became 6.3 degrees, 18.2 degrees, and 25.1 degrees, were prepared. These three different plasma-treated quartz plates, and the quartz plate not treated with plasma, were placed side by side, and sample 2 was applied on the top surfaces thereof using a spreading device at a coating speed of 5 mm/s by keeping a space of 25 μm between the quartz plate and the applicator. After the application, the plates were let stand for 5 minutes at 23°, and then measured for UV absorption wavelengths (absorption spectrum) to obtain the SPF value and UVA-PF value of the coating film.

The results are shown in Table 2.

Sample 2: Composition containing water, ethyl hexyl methoxy cinnamate, polyethylene glycol-30 hydrogenated castor oil, ethoxy diglycol, BG (butylene glycol), glycerin, t-butyl methoxy dibenzoyl methane, phenyl benzimidazole sulfonic acid, bisethyl hexyl oxy phenol methoxy phenyl triazine, and sucrose stearate.

TABLE 2

| Contact angle | SPF | UVA-PF |
| --- | --- | --- |
| 0 | 125.86 | 347.49 |
| 6.3 | 121.79 | 192.36 |
| 18.2 | 164.85 | 1581.70 |
| 25.1 | 165.77 | 846.50 |
| 74.9 | 25.14 | 77.70 |

As shown in Table 2, the SPF and UVA-PF values were higher when the contact angle was 18.2 degrees and 25.1 degrees. This is because, at these contact angles, the sample was applied uniformly on the quartz plates without undergoing phase separation, which resulted in these higher values. While the SPF and UVA-PF values varied considerably depending on the contact angle, as described above, the inherent SPF and UVA-PF values of the absorbent aqueous composition were measured when the contact angle was at these two levels. And, these SPF and UVA-PF values represent the characteristics of the absorbent aqueous composition itself which are independent of the application target, or specifically the characteristics of the absorbent aqueous composition as maximally demonstrated.

Example 3

A peripheral area of 2 mm in width of a quartz plate was covered with a masking tape, after which corona discharge treatment was applied, and then the masking tape was peeled. This substrate was coated with purified water by keeping a space of 25 μm between the quartz plate and the applicator.

Purified water did not run off when the substrate was tilted slightly, indicating that the formed coating film was stable.

Comparative Example 1

A film of purified water was formed on a super-hydrophilic substrate in the same manner as in Example 3, except that the masking tape in Example 3 was not used.

When the substrate was touched to remove it from a coater, purified water ran off from the side face.

According to the result of Example 3, use of the masking tape allowed only the necessary area to be surface-treated, which resulted in greater contact angles in areas adjacent to the area. This enabled formation of a stable coating film in the necessary area.

What is claimed is:

1. An absorbance measurement method comprising:
   (i) obtaining or providing multiple UV light-permeable substrates, each UV light-permeable substrate having a smooth flat surface which has irregularities of less than 2 μm,
   wherein the multiple UV light-permeable substrates
      have been plasma treated or arc-discharge treated under one set of treatment conditions and allowed to sit for a different length of time to achieve a contact angle with pure water in a range from approximately 0 to 15 degrees to approximately 60 to 70 degrees after aging wherein the surface has a property to increase the contact angle over time by aging, or
      have been corona-discharge treated under one set of treatment conditions and allowed to sit for a different length of time to achieve a contact angle with pure water in a range from approximately 0 degree to approximately 15 degrees after aging, wherein the surface has a property to increase the contact angle over time by aging,
   wherein the multiple UV light-permeable substrates have different contact angles with pure water by different aging periods;
   (ii) applying an absorbent aqueous cosmetic composition on the surface of a UV light-permeable substrate, among the multiple UV light-permeable substrates, to form a uniform coating film thereon at a predetermined amount in a range of 0.3 to 30.0 mg/cm²;
   (iii) irradiating the uniform coating film of the applied absorbent aqueous cosmetic composition with UV light to measure UV light absorbance of the applied absorbent aqueous cosmetic composition; and
   (iv) repeating steps (ii) and (iii) with a different UV light-permeable substrate having a different contact angle with pure water, among the multiple UV light-permeable substrates, until the measured UV light absorbance becomes near a maximum value, which is employed as a UV light absorbance of the absorbent aqueous cosmetic composition.

2. The absorbance measurement method according to claim 1, wherein the absorbent aqueous cosmetic composition is an O/W emulsion.

3. The absorbance measurement method according to claim 2, wherein the substrate is a quartz plate.

4. The absorbance measurement method according to claim 1, wherein the substrate is a quartz plate.

5. The absorbance measurement method according to claim 1, wherein the multiple UV light-permeable substrates include a UV light-permeable substrate having a contact angle of 0 degree with pure water with an aging period of zero.

6. An absorbance measurement device comprising:
   multiple UV light-permeable substrates, each having a smooth flat surface which has irregularities of less than 2 μm, wherein the multiple UV light-permeable substrates
      have been plasma treated or arc-discharge treated under one set of treatment conditions and allowed to sit for a different length of time to achieve a contact angle with pure water in a range from approximately 0 to 15 degrees to approximately 60 to 70.0 degrees after aging wherein the surface has a property to increase the contact angle over time by aging, or
      have been corona-discharge treated under one set of treatment conditions and allowed to sit for a different length of time to achieve a contact angle with pure water in a range from approximately 0 degree to approximately 15 degrees after aging, wherein the surface has a property to increase the contact angle over time by aging, wherein the multiple UV light-permeable substrates have different contact angles with pure water by different aging periods;

a base for fixing thereon at least one of the substrates; and a device for applying an absorbent aqueous cosmetic composition on the surface of the at least one of the substrates.

7. The absorbance measurement device according to claim 6, which is in use and further comprises the absorbent aqueous cosmetic composition applied on the surface of the at least one of the substrates, wherein the absorbent aqueous composition is an O/W emulsion.

8. The absorbance measurement device according to claim 7, wherein the substrate is a quartz plate, of which a surface has been plasma treated, arc-discharge treated, or corona-discharge treated.

9. The absorbance measurement device according to claim 6, wherein the substrate is a quartz plate, of which a surface has been plasma treated, arc-discharge treated, or corona-discharge treated.

10. The absorbance measurement device according to claim 6, wherein the multiple UV light-permeable substrates include a UV light-permeable substrate having a contact angle of 0 degree with pure water with an aging period of zero.

\* \* \* \* \*